Figure 3:
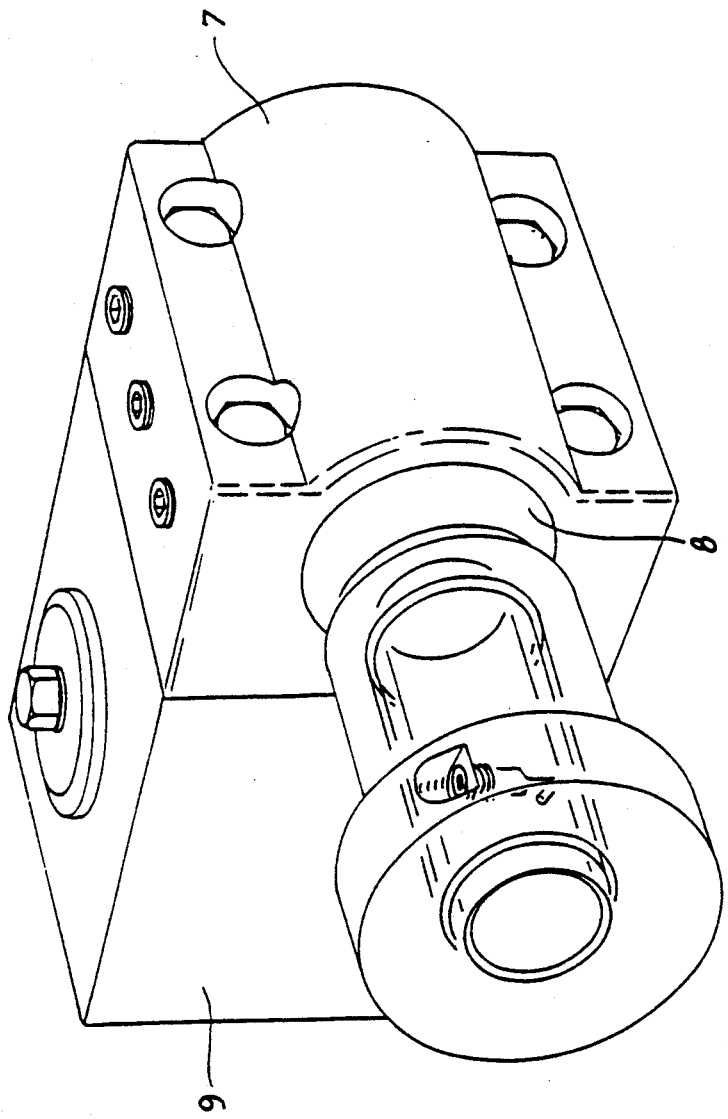

United States Patent [19]
Danielsen

[11] Patent Number: 5,237,895
[45] Date of Patent: Aug. 24, 1993

[54] HYDRAULIC TOOL HOLDER
[75] Inventor: Jan Danielsen, Örebro, Sweden
[73] Assignee: Spirex Tools AB, Örebro, Sweden
[21] Appl. No.: 828,994
[22] PCT Filed: Jun. 6, 1990
[86] PCT No.: PCT/SE90/00373
§ 371 Date: Feb. 4, 1992
§ 102(e) Date: Feb. 4, 1992
[87] PCT Pub. No.: WO91/18699
PCT Pub. Date: Dec. 12, 1991
[51] Int. Cl.⁵ .............................................. B23B 29/00
[52] U.S. Cl. .................................. 82/160; 279/2.08;
279/4.03; 408/239 A; 409/234
[58] Field of Search .................. 82/158, 160; 409/232,
409/234, 231; 279/2.08, 4.03, 143, 144; 408/239
R, 239 A, 240

[56] References Cited
U.S. PATENT DOCUMENTS

| 3,378,902 | 4/1968 | Hoexter | 279/4.03 |
| 3,388,917 | 6/1968 | Winnen et al. | 279/4.03 |
| 3,592,482 | 7/1971 | Better | 279/4 |
| 4,111,569 | 9/1978 | Mengel | 279/2.08 |
| 4,244,248 | 1/1981 | Adell et al. | 279/2.08 X |

FOREIGN PATENT DOCUMENTS

| 3148677 | 4/1986 | Fed. Rep. of Germany . |
| 3226244 | 5/1989 | Fed. Rep. of Germany . |
| 460264 | 9/1989 | Sweden . |
| 622977 | 5/1981 | Switzerland . |

Primary Examiner—Z. R. Bilinsky
Attorney, Agent, or Firm—Dennison, Meserole, Pollack & Scheiner

[57] ABSTRACT

A machine tool for machining contains a tool attachment (9) to which a tool holder (7) for a lathe shaft (10) can be secured. The shaft (10) is mechanically secured in the tool holder (7), which means that vibrations occur when long shafts (10) are used. The invention reduces any vibration by arranging a tubular cavity (4) inside the wall surrounding the shaft (10) in the holder, and filling said cavity with a medium which is subjected to pressure so that the tool (10) is clamped with a force greater than that which can be achieved by mechanical means.

4 Claims, 3 Drawing Sheets

FIG. 1
FIG. 2
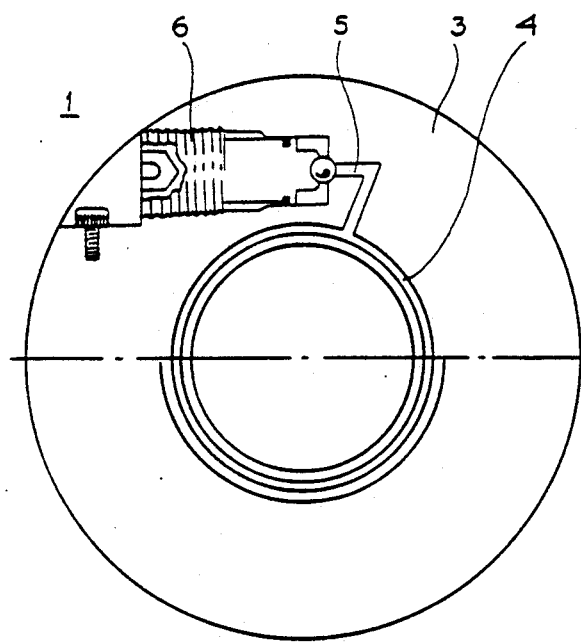
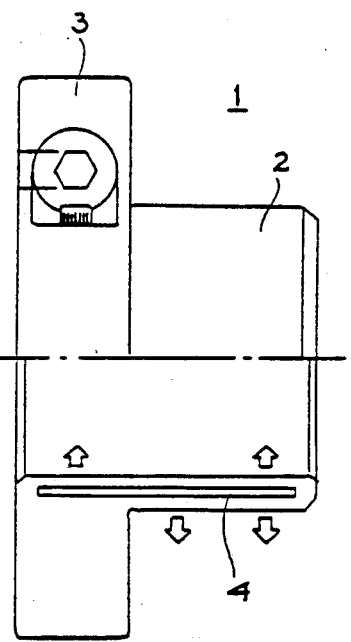

HYDRAULIC TOOL HOLDER

The present invention relates to a tool holder. The holder forms a part of a finishing machine and constitutes a holder for a machining tool such as a lathe shaft. In the finishing machine the holder is secured to a tool attachment which may either be a permanent fixture or located on a unit containing several tool holders, thus enabling several machining operations to be performed one after the other. It is often necessary for the machining tool to be rather long in order to permit machining inside the cavity of a work piece. If the machining tool is long there is considerably risk of it being subjected to vibration, and the quality of machining is therefore deteriorated. Several attempts have been made to reduce vibration. The tool shaft has, for instance, been arranged in a cradle and several screw joints have then been arranged along the shaft in order to press it against the cradle. However, the vibration has not been reduced to the desired extent and wear has also been caused at the orifice of the holder, thus giving rise to further vibration. The problem of vibration is troublesome, as is evident from Sandvik Coromant's publication entitled "Lathing with dampening lathe shafts" HV-5300:008-SWE.

The object of the present invention is to reduce the undesired vibration in long machining tools. According to the invention this is enabled by replacing mechanical attachment means with a hydraulic retaining arrangement wherein a tool holder is provided with an aperture to receive the shaft of a machining tool. Inside the aperture wall a tubular cavity is arranged which can be filled with a medium such as grease or oil. If said medium is subjected to pressure the wall of the aperture will be pressed radially inwards, thus clamping the shaft of the machining tool with an extremely considerable force. This force exceeds the forces which can be achieved by mechanical means. Inner sleeves or bushings having the same outer diameter as the inner diameter of the aperture can be inserted in said aperture so that the tool holder can be used for machining tools of different thicknesses.

According to a suitable embodiment of the present invention a bushing is prepared having a through-hold and a tubular part. An annular space of the above-mentioned type is arranged in the bushing and inside the aperture wall. The sleeve is inserted into the holder aperture and the medium in the annular cavity is then subjected to pressure so that the tool is clamped, as well as the outer wall of the sleeve being clamped against the aperture wall of the holder.

Additional characteristics of the present invention are revealed in the following claims.

Figure 4:
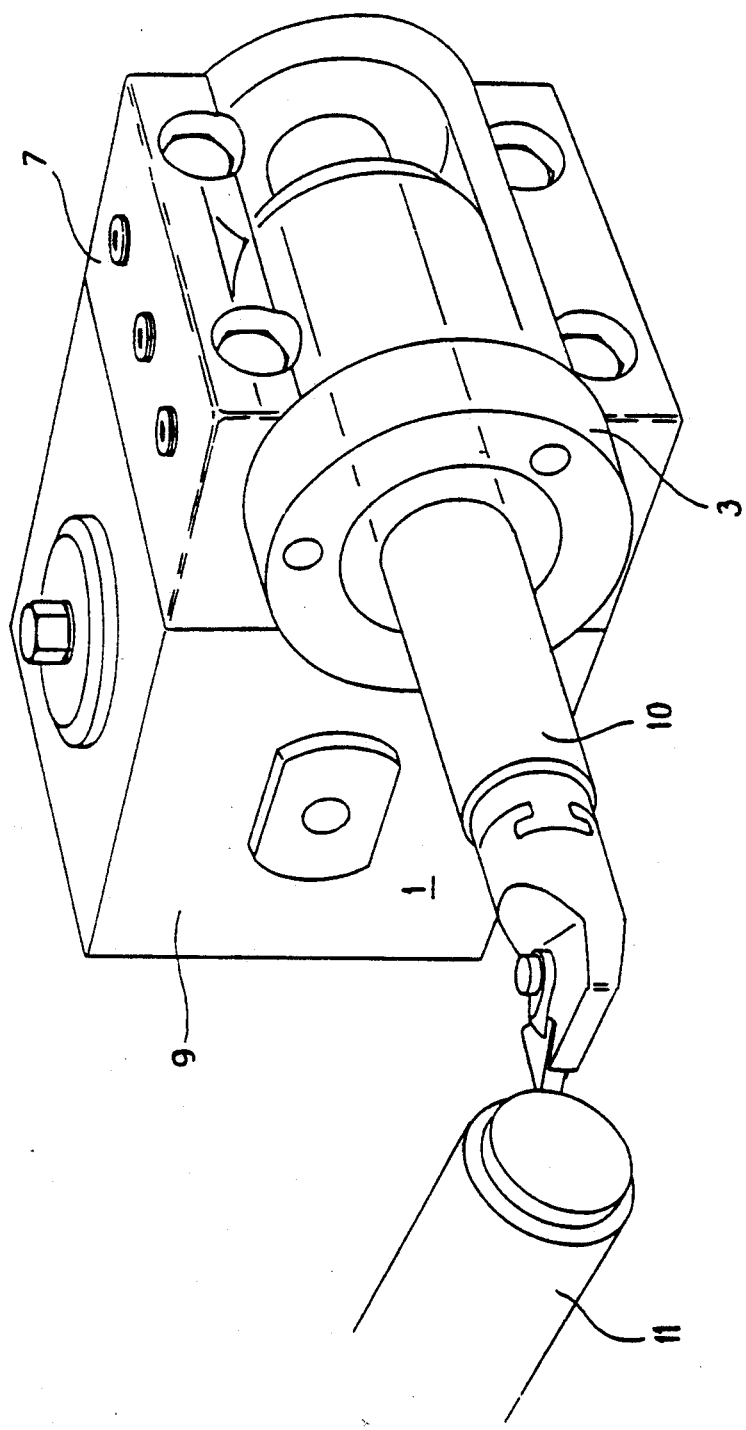

The present invention will be described in more detail with reference to the accompanying drawings in which FIG. 1 shows an end view of a sleeve intended for insertion into the aperture in the tool holder, FIG. 2 shows the sleeve seen from the side, FIG. 3 shows the sleeve during insertion into the tool holder, and FIG. 4 shows a tool holder together with a machining tool in function.

FIGS. 1 and 2 show a sleeve or a bushing 1 having a tubular part 2 and an annular end portion 3. The sleeve is provided with a tubular cavity 4 communicating with a pipe 5 for the supply of medium. The inlet is connected to a means 6 for adjusting the pressure in the medium located in the cavity 4. The pressure is adjusted by means of a screw which can be screwed in or out, thus adjusting the pressure. The inner sleeve or bushing shown in FIGS. 1 and 2 is designed for insertion into a tool holder 7, i.e. into the aperture 8 running through the tool holder 7. The tool holder is secured to a tool attachment 9 which may either be a permanent, immovable fixture or may be fitted on a movable member provided with several machining tools. In FIG. 4 the inner sleeve or bushing is fully inserted into the tool holder 7. A lathe shaft 10 is also inserted into the aperture in the inner sleeve or bushing. The device 6 is now actuated, and the lathe shaft 10 is thus subjected to an inwardly directed pressure which may be in the region of 2000 bar. At the same time as the shaft is subjected to an inwardly directed pressure, the outer wall of the cavity 4 will also be subjected to pressure outwards, thus achieving a high clamping force in the tool holder itself. The front end of the shaft 10 is provided with a tool for machining a work piece 11.

Another way of achieving clamping of the machining tool is for each machining tool to be provided with a sleeve 2 having a peripheral space 4. Each tool may have its own such sleeve, permanently attached. When the tool has been inserted into aperture 8, the medium in the space 4 of the built-in sleeve is subjected to pressure, whereupon the tool becomes firmly clamped in the tool holder 7.

I claim:

1. A tubular tool holding device comprising a bushing having an axial bore or tubular portion and an external sleeve portion, said axial bore being configured to receive and selectively support a cylindrical tool shank therein said tubular portion on said bushing complementary to and carried by a tool holder, fluid pressure means including an annular cavity defining a fluid pressure chamber positioned within said bushing concentric with said axial bore and fluid pressure means applicable to simultaneously expand said bushing and constrict said axial bore to simultaneously secure said tubular portion within said tool holder and said tool within the axial bore.

2. The tool holding device as claimed in claim 1, wherein said tool holder has a cylindrical shank and the tubular cavity extends along the cylindrical shank of a tool located in said aperture.

3. The tool holding device as claimed in claim 1 or 2, wherein a supplemental sleeve is provided for each tool, each sleeve having the same outer diameter as the inner diameter of the axial bore but having a different inner diameter, said inner diameter corresponding to the cylindrical shank of the tool.

4. The tool holding device as claimed in claim 1 wherein said annular cavity is positioned substantially along the axial bore and outer diameter of the tubular portion corresponds to the inner diameter of the tool holder bore.

* * * * *